Figure 6:
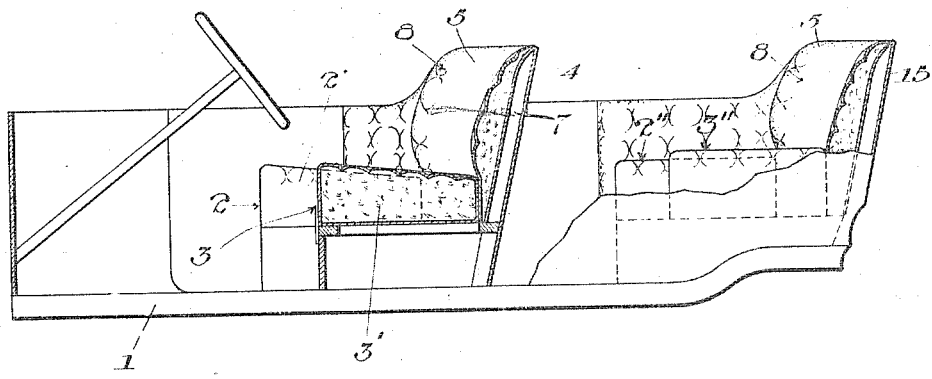

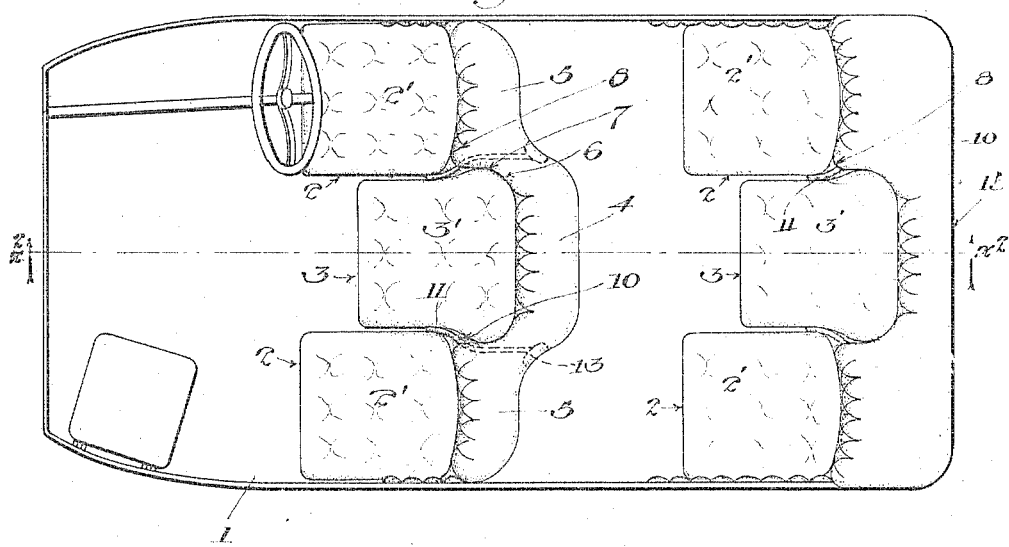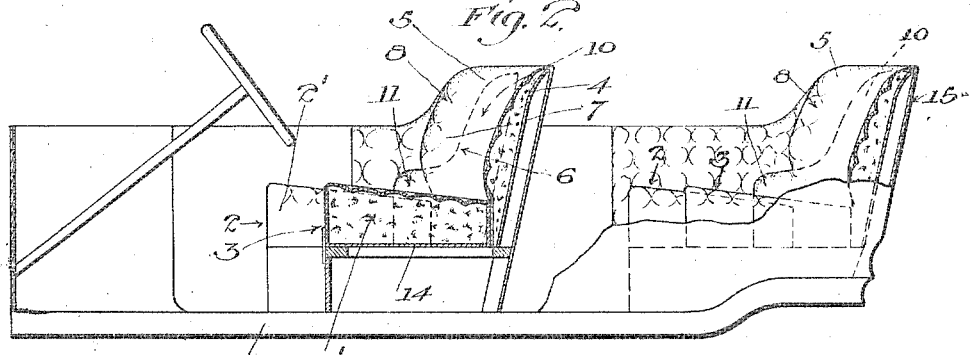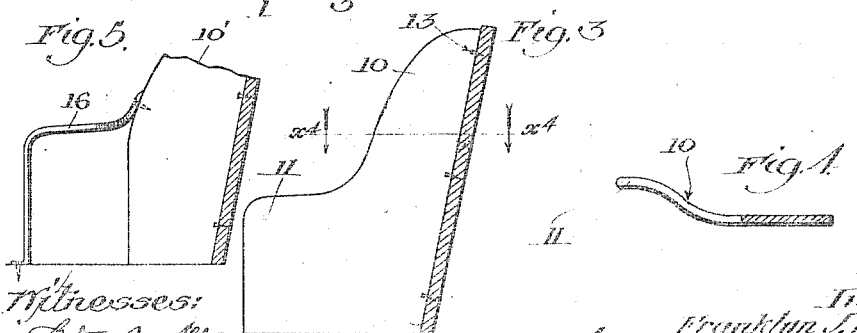

F. J. MORGAN.
AUTOMOBILE SEAT CONSTRUCTION.
APPLICATION FILED OCT. 9, 1912.

1,078,602.

Patented Nov. 11, 1913.

UNITED STATES PATENT OFFICE.

FRANKLYN J. MORGAN, OF LOS ANGELES, CALIFORNIA.

AUTOMOBILE SEAT CONSTRUCTION.

1,078,602.  Specification of Letters Patent.  Patented Nov. 11, 1913.

Application filed October 9, 1912. Serial No. 724,352.

*To all whom it may concern:*

Be it known that I, FRANKLYN J. MORGAN, a citizen of the United States, residing at Los Angeles, in the county of Los Angeles and State of California, have invented a new and useful Automobile Seat Construction, of which the following is a specification.

This invention relates to an improvement on the arrangement and form of body and seats for motor driven vehicles disclosed in my patent issued October 1, 1912, in which provision was made for seating three persons in one transverse row of seats in such manner that the total width for comfortably seating three persons was less than the width required when they are seated side by side in the usual manner.

The main object of the present invention is to provide means for separating the occupants of the several seats so as to prevent shifting or displacement of the persons while not interfering with the free movement of the upper part of the body.

A further object of the invention is to provide in one form, a division means for the above stated purpose which will be inconspicuous and which will not interfere with the elbows of the occupants or otherwise interfere with the comfort of the occupants, or detract from the general attractiveness of the appearance of the seats.

Other objects of the invention will appear hereinafter.

The accompanying drawings illustrate an embodiment of the invention, and referring thereto:

Figure 1 is a plan of the vehicle body. Fig. 2 is a longitudinal section on line $x^2-x^2$ in Fig. 1. Fig. 3 is a side elevation of one of the division boards. Fig. 4 is a horizontal section on line $x^4-x^4$ in Fig. 3. Fig. 5 is a view similar to Fig. 3, showing a modification. Fig. 6 is a view similar to Fig. 1, showing a modification.

The invention is particularly intended for use in connection with a motor driven vehicle, the body of such vehicle being indicated at 1, said body being here shown as provided with front and rear seats, although it will be understood that the invention is applicable to vehicle bodies having any desired number of seats.

The construction is substantially the same for the front and rear seats except for differences in shape of the rear portion of the back member and the following description of the construction for the front seat applies substantially to either front or rear seat.

The front seat is formed with two end seat sections 2 and an intermediate or middle seat section 3, said middle seat section being offset somewhat to the rear of the end sections 2 and the back for the seat being similarly formed with a middle portion 4 offset to the rear of the end portions 5 thereof. The seat sections 2 and 3 and the back sections 5 and 4 may be upholstered or padded in the usual or any other suitable manner, and the upholstering or padding is preferably formed so as to provide a continuous padded surface between the end sections 5 and the middle section 4, thereby providing a comfortable support or back rest on all portions thereof. For this purpose the padding or upholstering of the back is rounded forward from the rear central portion 4 at each side thereof, as shown at 6, and extends divergently outward, forming a shoulder 7 which is rounded at its forward end as shown at 8, so as to merge into the back section 5.

The shoulder 7 for the recessed or rearwardly offset middle section 4 of the back serves as a shoulder rest for the person occupying the middle section, while at the same time enabling free movement of his elbows and upper part of his body and the rearward offset of this portion of the back with relation to the back and of the middle seat section in relation to the corresponding seat portions at the end sections enables the person in the middle to sit far enough back to bring his shoulders out of line with the shoulders of the person at either side, so that each of the persons will have free movement of the upper part of the body. In order, however, to provide for lateral support of the several persons, a division member is provided, engaging with the lower portion or hips of the several persons, said division member consisting, for example, of the division board 10 secured in any suitable manner in the back of the seat and having its lower part extending forwardly as shown at 11, to project into the seating space at the rear portion of the seats, adjacent to the back and seat cushions. The body of the division board 10 is concealed within the padding of the back cushion and may be secured by any suitable means, for example, by nails or screws, to the posts or frame for the back, indicated at 13. The lower portion of said division board may extend down to and rest on the seat bottom 14, this portion of the division board extending between the several seat cushions 2' and 3' and projecting slightly above said seat cushions and forward of the back cushion in the angle between said seat and back cushion, so as to form a partial division between the several seats, adapted to engage with the hips of the several persons, allowing free movement of the elbows and leaving the forward portions of the seats clear and open for free movement of the knees of the persons. In order to give greater comfort and more securely hold the several persons from lateral movement, the division members 10 are preferably curved, as shown, so as to extend inwardly toward the front and then forwardly so that the division members on each side of the middle seat are forwardly convergent and the middle seat section is formed at its lower end with a lateral projection or enlargement, extending into the enlarged space between the rear portions of the side members, so that more room is thereby provided for the hips of the person occupying the middle section, while at the same time, more room is also provided for the hips of the person occupying the end section on account of the forward convergence of the division members.

The back seat sections 2 and 3 are formed similar to the front seat sections 2 and 3 and the front surface of the padding for the back of the rear section or rear seat is similar to that above described for the front seat. In order, however, to provide a desirable finish at back of the vehicle, the outside wall 15 of the rear seat may be formed straight or without following the curves of the forward surface. The division board in this case is formed in its exposed and operative portions substantially as above described, but is extended far enough to the rear to conform to the shape of the frame for the rear seat.

In the form shown in Fig. 5 a metal strap or rod 16 is attached to the division board 10', the latter having its front portion cut away. The rod 16 takes the place of the front edge of the cut away part.

The division boards 10, while advantageous are not absolutely essential, as the raised position of the center seat affords side walls or abutments for the adjoining side seats, so that a person sitting in either side seat will be held from shifting sidewise by the raised portion of the center seat. It is to be observed that while in the present instance I have shown the upper surfaces of the cushions inclined and that thereby the higher front portion of the center seat is opposite the lower rear portions of the side seats, thus forming the abutment before referred to, that the abutment need not necessarily be secured in this manner with the surface of the seats inclined.

In Fig. 6, I have shown a modification in which the division boards 10 have been omitted and I have also shown the front seats inclined, as in the previous form, and providing the abutment, and have shown the rear seats 2", 3" with level surfaces, the center seat being raised above the side seats, thereby forming the abutment.

What I claim is:—

1. A seat construction for motor cars comprising two end seats and a middle seat between the end seats, backs for the seats, the backs of the end seats being narrower than the end seats and the inner corners of said backs being offset toward the sides, thereby giving additional width for the back portion of the middle seat, the rear part of said middle seat being wider and extending into said space.

2. A seat construction for motor cars comprising two side seats and a middle seat between the side seats projecting farther back than the side seats, said seats being arranged in substantially parallel relation, the back portion of the middle seat being wider than the front part of the middle seat and extending laterally behind the side seats.

In testimony whereof, I have hereunto set my hand at Los Angeles, California, this 11th day of September, 1912.

FRANKLYN J. MORGAN.

In presence of—
GEO. T. HACKLEY,
MARY E. BLASDEL.